United States Patent [19]

Bergen et al.

[11] Patent Number: 4,672,444
[45] Date of Patent: Jun. 9, 1987

[54] METHOD FOR TRANSMITTING A HIGH-RESOLUTION IMAGE OVER A NARROW-BAND COMMUNICATION CHANNEL

[75] Inventors: James R. Bergen, Hopewell; Curtis R. Carlson, Princeton, both of N.J.

[73] Assignee: RCA Corporation, Princeton, N.J.

[21] Appl. No.: 797,915

[22] Filed: Nov. 14, 1985

[51] Int. Cl.$^4$ .............................................. H04N 7/12
[52] U.S. Cl. .................................... 358/140; 315/378; 340/720; 340/731; 358/133
[58] Field of Search ............... 358/140, 137, 134, 133; 340/720, 724, 727, 731, 744; 315/378

[56] References Cited

U.S. PATENT DOCUMENTS

| | | | |
|---|---|---|---|
| 3,380,028 | 4/1968 | Gustafson | 340/744 |
| 3,438,003 | 4/1969 | Bryan | 340/724 |
| 3,576,574 | 4/1971 | Baskin | 340/731 |
| 3,979,742 | 9/1976 | Kolb | 315/378 |
| 3,980,926 | 9/1976 | Krueger | 340/744 |
| 4,222,076 | 9/1980 | Knowlton | 358/133 |
| 4,520,396 | 5/1985 | Dischert | 358/167 |
| 4,523,230 | 6/1985 | Carlson | 358/167 |

OTHER PUBLICATIONS

R. C. Nicol et al., "Transmission Techniques for Picture Viewdata," *British Telecommunications Research Department Report No.* 860, Project No. 32 602, Publication Authorized Jul. 30, 1980, pp. 1–11.

Peter J. Burt, et al., "The Laplacian Pyramid as a Compact Image Code", *IEEE Transactions On Communications*, vol. COM-31, No. 4, Apr. 1983, pp. 532–540.

U.S. Patent Application, Ser. No. 596,817, filed Apr. 4, 1984, Carlson et al.

*Primary Examiner*—Howard W. Britton
*Attorney, Agent, or Firm*—Joseph S. Tripoli; George J. Seligsohn

[57] ABSTRACT

By analyzing the spatial-frequency spectrum of a high-resolution image into a low-pass remnant subspectrum band having a nominal high-frequency cutoff below that of one or more other spatial frequency bands, and separately transmitting each band, starting with the remnant band, over a narrow-band communication channel from a transmitter to an image display at a remote receiver, useful information as to the image contents is available more quickly to the viewer of the display than by past methods of transmitting high-resolution image information over a narrow-band communication channel for display.

20 Claims, 6 Drawing Figures

SPATIAL POSITION-VS.-TIME
FORMAT OF IMAGE DISPLAY
OF PICTORIAL INFORMATION

Fig. 1

PRIOR ART

Fig. 2

Fig. 3 a) ANALYZE HIGH-RESOLUTION IMAGE SPECTRUM b) STORE ANALYZED SUBSPECTRA c) TRANSMIT ENTIRE LOWEST SUBSPECTRUM d) RECEIVE AND STORE LOWEST SUBSPECTRUM AND THEN DERIVE THEREFROM DISPLAY OF LOW-RESOLUTION ENTIRE IMAGE e) TRANSMIT ENTIRE NEXT-LOWEST SUBSPECTRUM f) RECEIVE NEXT-LOWEST SUBSPECTRUM AND COMBINE WITH PRECEDING STORED SUBSPECTRUM (OR SYNTHESIZED SPECTRUM) TO PROVIDE SYNTHESIZED SPECTRUM g) STORE SYNTHESIZED SPECTRUM, AND THEN DERIVE THEREFROM DISPLAY OF HIGHER-RESOLUTION ENTIRE IMAGE h) [REPEAT STEPS e), f) AND g), IN ORDER, FOR EACH IMMEDIATELY SUCCEEDING SUBSPECTRUM UNTIL ENTIRE HIGH-RESOLUTION IMAGE IS DISPLAYED]

Fig. 6 a) ANALYZE HIGH-RESOLUTION IMAGE SPECTRUM b) STORE ANALYZED SUBSPECTRA c) TRANSMIT ENTIRE LOWEST SUBSPECTRUM d) RECEIVE AND STORE LOWEST SUBSPECTRUM AND THEN DERIVE THEREFROM DISPLAY OF LOW-RESOLUTION ENTIRE IMAGE e) COMBINE AT TRANSMITTER NEXT-LOWEST SUBSPECTRUM WITH LOWEST SUBSPECTRUM (OR PRECEDING SYNTHESIZED SPECTRUM) TO PROVIDE CURRENT SYNTHESIZED SPECTRUM f) TRANSMIT ENTIRE CURRENT SYNTHESIZED SPECTRUM TO RECEIVER g) AT RECEIVER, REPLACE STORED LOWEST SUBSPECTRUM (OR PRECEDING STORED SYNTHESIZED SPECTRUM) WITH CURRENT SYNTHESIZED SPECTRUM AS IT IS RECEIVED, AND THEN DERIVE THEREFROM DISPLAY OF HIGHER-RESOLUTION ENTIRE IMAGE h) [REPEAT STEPS e), f) AND g), IN ORDER, FOR EACH IMMEDIATELY SUCCEEDING SUBSPECTRUM UNTIL ENTIRE HIGH-RESOLUTION IMAGE IS DISPLAYED]

METHOD FOR TRANSMITTING A HIGH-RESOLUTION IMAGE OVER A NARROW-BAND COMMUNICATION CHANNEL

BACKGROUND OF THE INVENTION

I. Field of the Invention:

This invention relates to a method for transmitting a given relatively high-resolution image from a transmitter to a receiver over a narrow-band communication channel for display of the image at the receiver.

II. Description of the Prior Art:

Ordinarily, a relatively high-resolution image (e.g., an image contained in each successive television frame), is transmitted to a receiver over a wide-band communication channel for display of the image at the receiver. However, there are several cases in which transmission of the high-resolution image to a receiver is restricted to a narrow-band communication channel. One such case is so-called "teletex," in which successive pixels (which are normally in digitally-encoded sample form, but could be in analog form) of a given high resolution image are transmitted only during one or two horizontal scan lines of the vertically-blanked portion of each of a plurality of successive television frames. Another case is so-called "videotex," in which such successive pixels (which are normally in digitally-encoded sample form, but could be in analog form) of a high-resolution image are transmitted (either in digital or analog form) over a voice-grade telephone line. A wide-band television channel transmits the entire relatively high-resolution video image contained in each NTSC television frame in only 33 milliseconds (ms). Because a narrow-band voice-grade telephone line only has about 1/2000 th the capacity of a wide-band television channel, the same image that takes only 33 ms to transmit over a television channel takes at least one minute over a voice-grade telephone line.

Usually the purpose of transmitting an image from a transmitter to a receiver is to display the image on the screen of a cathode-ray-tube (CRT), so that it may be observed and comprehended by a viewer. Watching an image appear slowly, on line at a time, on the CRT screen is very frustrating. This is particularly so if the viewer is trying to find a certain image in a sequence of images. Part of the reason for this is that when the image is comprised of pictorial information (which is often), it takes the transmission and display of about the first one-third of the image before the viewer is able to garner some idea of what type of picture information is contained in the image. This means that, in the case of a voice-grade telephone line, the viewer must view a mostly blank screen for at least about 20 to 30 seconds before he has sufficient usable information to decide whether or not the image then being displayed is one in which he may be interested.

SUMMARY OF THE INVENTION

The purpose of the present invention is to maximize the amount of information available quickly to a viewer of an image display, despite the fact that relatively high-resolution image information is still in the process of being communicated thereto from a transmitter over a narrow-band communication channel. More specifically, in accordance with the method of the present invention, the spatial frequency spectrum of a given relatively high-resolution image is analyzed into a plurality of subspectra spatial frequency bands including at least one spatial-freuqency bandpass subspectrum and a low-pass remnant subspectrum comprised of spatial frequencies below those of any bandpass subspectrum. Initially, only the entire remnant subspectrum is transmitted to a receiver over a narrow-band communication channel during a first time interval. The length of this first time interval is short compared to the minimum length of a time interval sufficient to transmit the entire relatively high-resolution image from the transmitter to the receiver over the narrow-band communication channel. At the receiver, the remnant subspectrum is stored, and a relatively low-resolution display of the given image is derived therefrom. Subsequent to the end of the first time interval, the entire one bandpass subspectrum is transmitted from the transmitter to the receiver over the narrow band communication channel during a second time interval. At the receiver, the one bandpass subspectrum is combined with the stored remnant subspectrum to provide a synthesized spectrum. The synthesized spectrum is stored and a display of the given image at a higher resolution than the relatively low-resolution display is derived therefrom.

PREFERRED EMBODIMENTS

Figure 1:
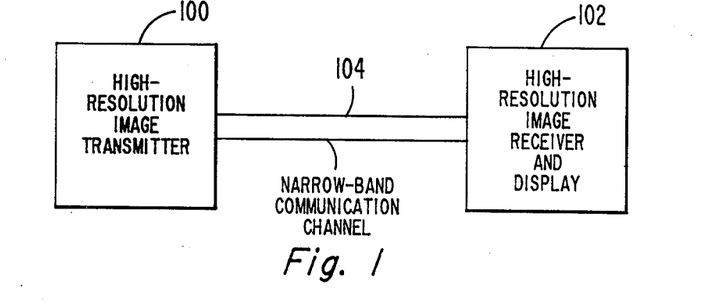
FIG. 1 is a generalized showing of a high-resolution image transmitter coupled to a high-resolution image receiver and display by a narrow-band communication channel.

Referring to FIG. 1, there is shown a generalized high-resolution image transmitter 100 coupled to a generalized high-resolution image receiver and display 102 by a narrow-band communication channel 104. By way of example, the high-resolution image transmitted by transmitter 100 may be a teletex image, a news wire photo, or an image digitally-stored in a data bank. The high-resolution image may be transmitted by transmitter 100 over narrow-band communication channel in either digital or analog form. Narrow-band communication channel 104 may be a teletex channel or a voice-grade telephone line, by way of example. High-resolution image receiver and display 102 may or may not be interactive with transmitter 100.

Known in the art is a network of remote interactive terminals, each of which includes a high-resolution image receiver and display that has access through a narrow-band telephone line to a central high-resolution image transmitter that includes a data bank in which a large number of different images of pictorial and/or alphanumeric information are stored. In this case, each high-resolution image receiver and display includes a computer (or at least a telephone tone-dial key pad), so that any requesting high-resolution image receiver and display may send appropriate digital address information back to the central high-resolution image transmitter over a narrow-band telephone line to cause a selected image stored in the data bank of the high-resolution image transmitter to be forwarded over the narrow-band telephone line to the requesting high-resolution image receiver for display thereby. Each high-resolution image receiver and display further includes a memory for storing the received selected image and means for deriving therefrom a display of the stored selected image.

For illustrative purposes in describing the present invention, it is assumed that transmitter 100 is a high-resolution image transmitter including a data bank for storing a large number of images, of the type described above; high-resolution image receiver and display 102 is one of a plurality of interactive remote terminals, of the type described above, which has access to transmitter 100 over a narrow-band communication channel 104 comprised of a voice-grade telephone line. However, it should be understood that the present invention is not limited to the assumed case.

Figure 2:
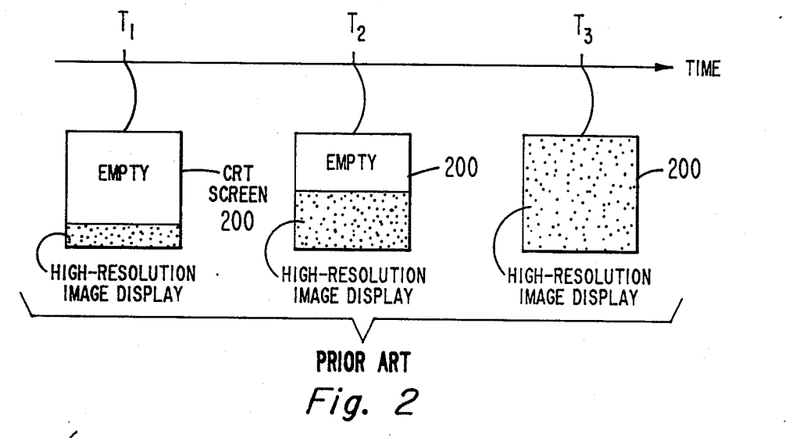
FIG. 2 schematically illustrates the manner in which the prior art displays successive portions of a high-resolution image that is being sequentially transmitted to the display over the narrow-band communication channel.

As known in the art, the type of image information stored in central data banks includes catalogues, in which each page of the catalogue is comprised of a separately addressable image. The viewer of an interactive remote terminal comprised of high-resolution image receiver and display 102 may wish to browse through such a catalogue, looking for items of interest. Assume that the viewer initially requests that the first page of the catalogue be transmitted to his receiver and display 102. In the prior art, successive pixels of the high-resolution image of the selected page are sequentially transmitted over narrow-band telephone-line communication channel 104, and then stored and displayed as they are received in the receiver and display 102 of the viewer. As discussed above, it takes at least one minute to transmit an entire high-resolution image over a narrow-band telephone line communication channel. Therefore, as schematically shown in FIG. 2, after a short time $T_1$ (5 or 10 seconds) only a small portion of the high-resolution image of the requested first calalogue page is displayed on CRT screen 200 of the display of the viewer (most of screen 200 remaining empty). Therefore, at time $T_1$, the viewer has very little idea of the information included in the requested first page of the catalogue. As indicated in FIG. 2, at a later time $T_2$ (about 30 seconds in the assumed example), about one-half portion of the high-resolution image is displayed on screen 200 and the other half of screen 200 still remains empty. Finally, at a still later time $T_3$ (1 minute in the assumed example) the entire high-resolution image timely fills the display on screen 200. Depending on the content of the particular image defined by the first page of the catalogue, the viewer may have to wait at least somewhere between 20 and 30 seconds until enough of the high-resolution image is displayed on screen 200 for the viewer to be able to decide whether he is interested in the contents of page 1 of the catalogue (in which case he waits until time $T_3$) or whether he wishes to call up for display some other page of the catalogue.

This prior art process, besides wasting time (which may increase the cost to the viewer for using the data bank), tends to be annoying to most viewers. The present invention is directed to a method which overcomes this problem, by making it possible for the viewer to much more quickly have sufficient information about the contents of the displayed image to decide whether he wants to view it and display it or, alternatively, whether he wants to replace it with a display of another image stored in the data bank of transmitter 100.

As known in the art, information contained in a given image is defined by the spatial frequency spectrum of the given image, the spatial frequency spectrum being two dimensional in the case of a two-dimensional image. A high-resolution image is defined by a spatial frequency spectrum which includes both relatively low spatial frequencies and relatively high spatial frequencies. The relatively low spatial frequencies define the coarse features of the high-resolution image, while the high spatial frequencies define the fine detail of the high-resolution image. It takes significantly fewer pixels to define only the coarse features of the high-resolution image than it does to define only the fine features or both the coarse and fine features of the high-resolution image.

The present invention takes advantage of the above facts to first transmit and display a low-resolution image of only the coarse features defined by the low spatial frequencies of the spectrum of the high-resolution image. Since the number of pixels making up the entire low-resolution image is relatively small compared to the number of pixels making up the entire high-resolution image, the low-resolution image can be transmitted over the narrow-band telephone-line communication channel during a time interval that is short compared to the minimum length of a time interval sufficient to transmit and display the entire high-resolution image. Thereafter, the higher spatial frequencies (either with or without the lower spatial frequencies) of the high-resolution image may be transmitted over the narrow-band telephone-line communication channel to relatively slowly upgrade the resolution of the displayed image until the entire high-resolution image is displayed.

The total amount of information which must be transmitted over narrow-band communication channel 104 is greater in the present invention then it is in the prior art. Therefore, it takes longer (more than one minute) to display an entire high-resolution image in the present invention than it does in the prior art. However, the fact that a low-resolution display of entire image is available to the viewer in 15 seconds or less makes it possible for the viewer to discern in 15 seconds or less whether or not he is interested in the image information being displayed. Thus, in the assumed example of catalogue pages, the viewer is much more quickly in a position to call up another catalogue page if he decides from the low-resolution image of the currently displayed catalogue page that he is not interested in the contents thereof.

Figure 3:
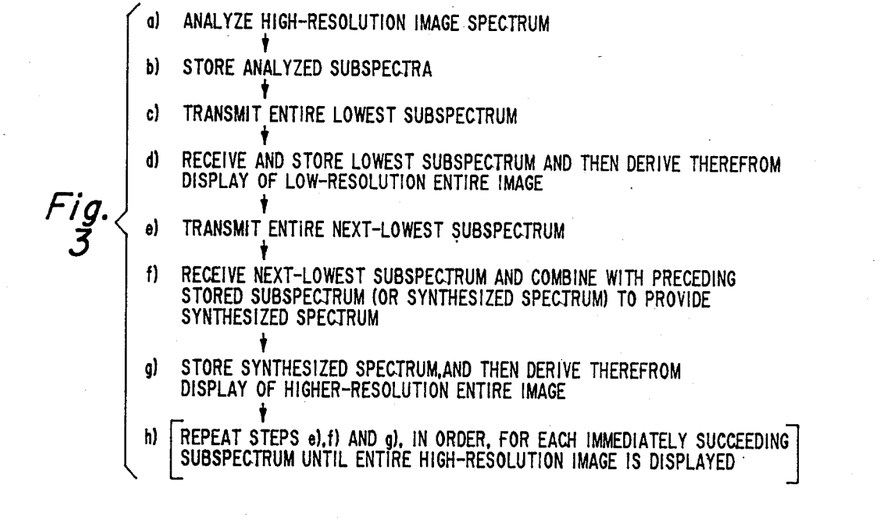
FIG. 3 is a flow chart showing the successive method steps of a first embodiment of the present invention.

Referring to FIG. 3, the first step (a) of a first embodiment of the method of the present invention is to analyze the high-resolution image spatial-frequency spectrum. This analysis may take place in transmitter 100 or it may take place somewhere else. It is preferred that the image spectrum be analyzed in accordance with the so-called Burt Pyramid algorithm, although other types of image spectrum analyzers known in the art can be used instead. In this regard, reference is made to copending U.S. patent application Ser. No. 596,817, filed Apr. 4, 1984, by Carlson, et al. and assigned to the assignee of the present invention. This co-pending application, entitled "Real-Time Hierarchial Pyramid Signal Processing Apparatus," incorporates a list of articles, authored or co-authored by Dr. Burt, which describe in detail various aspects of the Burt Pyramid. One of these articles, which is of particular interest in connection with the present invention, is "The Laplacian Pyramid as a Compact Image Code," by Peter J. Burt, et al., *IEEE Transactions on Communications,* Vol, COM-31, No. 4, 532–540, April 1983. The Burt Pyramid may be implemented by means of a computer in non-real time in accordance with the teachings of this article and the other articles listed in co-pending patent application Ser. No. 596,817. On the other hand, the Burt Pyramid may be implemented in real time in accordance with the teaching of co-pending patent application Ser. No. 596,817, itself.

Briefly, a Burt Pyramid analyzer may be employed to analyze the spatial frequency spectrum of a given image into a plurality of contiguous spatial frequency bands including a set of N spatial-frequency bandpass (Laplacian) subspectra (where N is an integer having a value of at least one, but which is usually greater than one) and a low-pass remnant (Gaussian) subspectrum comprised of spatial frequencies below those of any bandpass subspectrum. Preferably, each of the bandpass subspectra is about one octave in bandwidth. That is, the highest spatial-frequency bandpass subspectrum covers about the top one-half of the spatial frequency spectrum of the analyzed given image in each of its two dimensions, the next-to-highest spatial-frequency bandpass subspectrum covers about that one-fourth of the spatial frequency spectrum of the given image in each of its two dimensions which is contiguous with and below the highest spatial frequency bandpass subspectrum, etc. The Burt Pyramid employs gradual rolloff filter characteristics, rather than "brick wall" filter characteristics to derive the respective spatial-frequency subspectra. A "brick wall" filter characteristic has precisely-defined cutoff frequencies. However, a gradual rolloff filter characteristic has only nominal cutoff frequencies—a nominal cutoff frequency being defined as that frequency at which the relative filter transmission is some certain selected arbitrary amount below its maximum transmission (e.g., 3db, 10db, 20db, etc., as the case may be). The precisely-defined cutoff frequencies of a "brick wall" filter characteristic and its nominal cutoff frequencies are, of course, identical.

In the Burt Pyramid, the analyzed image is preferably sampled at a sampling density sufficiently high to conform with the Nyquist criterion for all spatial frequencies within the spatial frequency spectrum of the analyzed image. However, each subspectrum of the analyzed image below the highest bandpass subspectrum is subsampled at a sampling density which is preferably one-half of the sampling density of its immediately higher contiguous subspectrum in each of the two dimensions of the analyzed image. The result is that the sampling density of each subspectrum below the highest spatial frequency subspectrum is only one-fourth the sampling density of its next higher contiguous subspectrum. Therefore, even a relatively small set of N spatial-frequency bandpass subspectra permits the entire area of the entire area of the analyzed image to be defined at low resolution by a relatively small number of remnant-subspectrum samples. For instance, a value of N of two reduces the number of samples in the remnant subspectrum by a factor of 16 ($4^2$), a value of N of three reduces the number of samples in a remnant subspectrum by a factor of 64 and the value of N of four reduces the number of samples in the remnant subspectrum by a factor of 256.

All images, regardless of their specific information content, can be analyzed into a plurality of contiguous spatial frequency bands in a generalized manner employing a single set of predetermined filter kernel weighting functions. However, it is desirable, from the point of view of the present invention, that each image, or at least each type of image, be analyzed in accordance with its specific information content, so that those portions which are of significance to the ultimate viewer are retained while unnecessary and undesirable portions are eliminated. In any event, after the analysis of the spatial frequency spectrum of the given image is completed, the samples defining all (or possibly only the remnant subspectrum and some but not all of the bandpass subspectra) are stored in a memory incorporated in transmitter 100, as indicated by step (b) of FIG. 3.

As further indicated in FIG. 3, the next step (c) is to transmit the entire lowest (remnant) subspectrum stored in transmitter 100 over narrow-band telephone-line communication channel 104 to receiver and display 102. Since the number of stored pixels making up the entire remnant subspectrum is quite small (for reasons discussed in detail above), the length of the time interval required to transmit only the entire remnant subspectrum from the transmitter to the receiver over the narrow-band communication channel is short compared to the minimum length of a time interval sufficient to transmit the entire original high-resolution image from the transmitter to the receiver over the narrow-band communication channel.

In practice, it usually takes only a few seconds (no more than 15) for the entire transmitted remnant subspectrum to be received and displayed. Specifically, as indicated by step (d) of FIG. 3, at receiver and display 102 the remnant subspectrum is stored, and then a relatively low-resolution display of the analyzed image is derived. This low-resolution display is usually sufficient for a viewer to determine whether or not he might be interested in the information displayed. If he is interested, the process is permitted to continue; if not, the viewer can immediately call up for display another analyzed image stored in transmitter 100.

Assuming that the viewer permits the process to continue, subsequent to the end of the time interval during which a remnant subspectrum is transmitted, the next-lowest subspectrum of the stored analyzed image in transmitter 100 is transmitted over narrow-band communication channel 104 to receiver and display 102, as indicated by step (e) in FIG. 3.

As known in the art, it is possible to combine two subspectra (e.g., a remnant subspectrum with a bandpass subspectrum) to provide a synthesized spectrum. In the case of the Burt Pyramid, this is achieved by first increasing the sample density of the lower sample-density subspectrum (e.g., remnant subspectrum) to the sample density of the higher subspectrum (bandpass subspectrum), and then summing spatially-corresponding samples of the two subspectra. As indicated by step (f) of FIG. 3, receiver and display 102 receives the next-lowest subspectrum that has been transmitted and combines it with a preceding stored subspectrum (e.g., the remnant subspectrum) to provide thereby a synthesized spectrum. And, as indicated by step (g) of FIG. 3, a synthesized spectrum is stored and a display of a higher-resolution entire image is derived therefrom.

If the analyzed high-resolution image is comprised of only a remnant subspectrum and a single bandpass subspectrum, the "higher-resolution" image displayed by step (g) of FIG. 3 corresponds to the full analyzed high-resolution image. Therefore, no further steps are required. Usually, the "next-lowest" subspectrum that is transmitted in step (e) of FIG. 3 is contiguous with the remnant subspectrum. However, this need not be the case. It is possible to analyze a high-resolution image into a remnant subspectrum and a plurality of bandpass subspectra, but transmit to receiver and display 102 over narrow-band communication channel 104 only the remnant subspectrum and a single bandpass subspectrum which is not contiguous with the remnant subspectrum. Therefore, step (g) FIG. 3 is also the last step in this latter case.

In the most usual case, a high-resolution image spectrum is analyzed into an ordinally-arranged set of N contiguous bandpass subspectra (where N is an integer greater than one), with the ordinally-arranged set starting with the bandpass subspectrum of the set which is contiguous with the remnant subspectrum. Further, it is usual to transmit, in order, all of the ordinally-arranged bandpass subspectra of the set following the transmission and display of the remnant subspectrum. Therefore, as indicated by step (h) of FIG. 3, each of steps (e), (f) and (g) is repeated, in order, for each immediately succeeding subspectrum of the ordinally-arranged set that follows the first subspectrum of the ordinally-arranged set. This process continues until the entire analyzed high-resolution image spectrum is displayed. In this case, each time step (f) is repeated, the received next-lowest subspectrum is combined with a preceding stored synthesized spectrum --i.e., the synthesized spectrum that was stored in the preceding step (g). This differs from the first time that step (f) is performed, wherein the first subspectrum of the ordinally-arranged set is combined with the stored remnant subspectrum.

Figure 4:
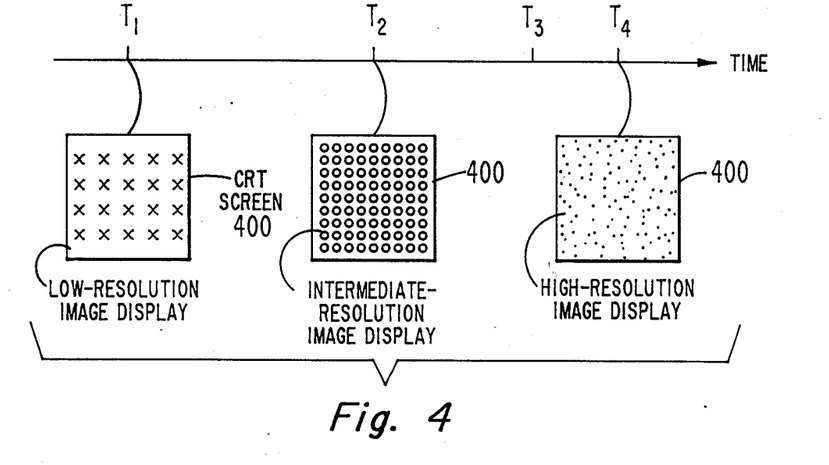
FIG. 4 schematically illustrates the manner in which the present invention displays successive portions of a high-resolution image sequentially transmitted to the display over a narrow-band communication channel.

Referring to FIG. 4, there is schematically shown the display on CRT screen 400 of receiver and display 102 of each of successive times $T_1$, $T_2$ and $T_4$ ($T_4$ being longer than $T_3$). For illustrative purposes, it is assumed that the analyzed image of the spatial frequency spectrum of the original high-resolution image has been analyzed into three contiguous subspectra consisting of a remnant subspectrum and first and second bandpass subspectra. At time $T_1$, the remnant subspectrum provides a display of the entire area of the image at low resolution on screen 400. This differs markedly from the prior art shown in FIG. 2, wherein at time $T_1$ only a small portion of the entire area of the image is displayed at high-resolution on screen 200. At a later time $T_2$, the combined remnant and first bandpass subspectra provides a display of the entire area of the image at intermediate resolution on screen 400. In the prior art, shown in FIG. 2, the high-resolution image display on screen 200 still does not include the entire area of the image at time $T_2$. It takes a still longer time $T_3$ until the entire area of the image is displayed on screen 200 at high-resolution. In FIG. 4, it takes even a longer time $T_4$ than $T_3$ until the combined remnant and first and second bandpass subspectra provides a high-resolution display of the entire image on screen 400. This is because the total number of pixels of all of the subspectra of an analyzed high-resolution image (all of which must be transmitted over the narrow-band communication channel) is about thirty percent greater than the total number of pixel of the unanalyzed high resolution image itself. However, at times $T_1$ and $T_2$, the viewer of screen 400 can gain significantly more useful information than can a viewer of screen 200.

Figure 5:
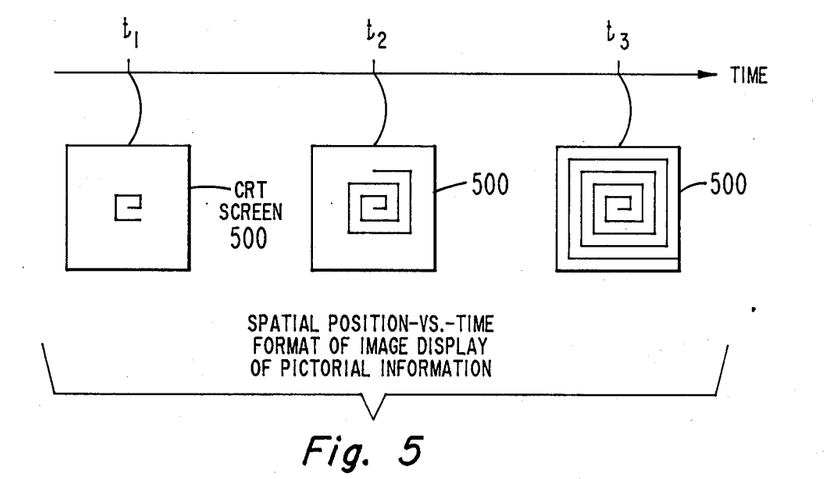
FIG. 5 schematically illustrates a preferred spatial position-vs-time format of image display of pictorial information in accordance with an additional feature of the present invention.

It is conventional to transmit image information from bottom-to-top (as shown in FIG. 2), or, alternatively, from top-to-bottom. This is fine in the case of image information comprised of text. However, in the case of an image comprised of pictorial information, the most useful information to a viewer of a displayed image is usually at or near the center of the displayed image. For this reason, the spatial position-vs-time format of image display of pictorial information shown in FIG. 5 is to be preferred. In FIG. 5, pictorial image information stored in transmitter 100 (which may be either the entire unanalyzed image or any one of the analyzed image subspectra) is read out of storage and transmitted to receiver and display 102 over narrow-band communication channel 104 starting with the pictorial information closest to the center of the image, then proceeding sequentially to the pictorial information farther and farther from the center of the image. At receiver and display 102, the information is stored and read out to the display in the same order. As shown in FIG. 5, the result is that at time $t_1$, only a small portion of the image surrounding the center of screen 500 is displayed. At a latter time $t_2$, a larger portion of the image surrounding the center of screen 500 is displayed. And at a still latter time $t_3$, an entire image is displayed on screen 500.

It will be seen that the spatial position-vs-time format of image display pictorial information shown in FIG. 5 cooperates with the low-resolution image display shown in FIG. 4 to provide a viewer of the display with the most useful information in the shortest time. Thus, the viewer of a display in which high-resolution pictorial image information is being received at a slow rate over a narrow-band communication channel can more quickly determine whether or not he is interested in the contents of the image being received.

Figure 6:
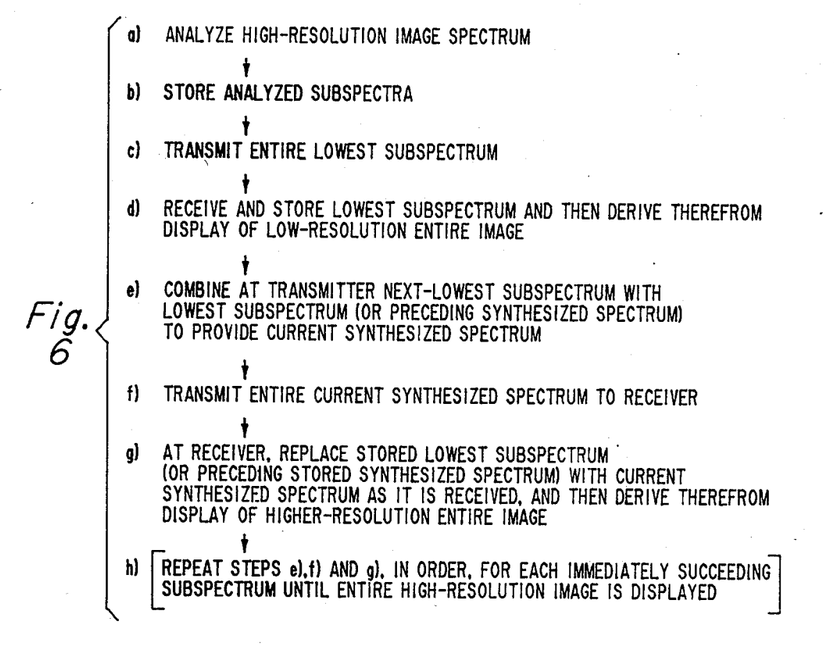
FIG. 6 is a flow chart showing the successive method steps of a second embodiment of the present invention.

Referring to FIG. 6, there is shown a second embodiment of the present invention, which may be employed as an alternative to the above-described first embodiment shown in FIG. 3. This alternative second embodiment differs from the first embodiment by deriving each synthesized spectrum (formed by the combination of the remnant subspectrum with one or more bandpass subspectra) at the transmitter, rather than at the receiver.

As indicated in FIG. 6, steps (a), (b), (c) and (d) of the second embodiment are respectively identical to steps (a), (b), (c) and (d) of the first embodiment shown in FIG. 3. However, each of steps (e), (f) and (g) of the second embodiment shown in FIG. 6 are respectively different from the steps (e), (f) and (g) of the first embodiment shown in FIG. 3. Specifically, in FIG. 6, step (e) consists of combining at the transmitter the next-lowest subspectrum with either the lowest subspectrum (or the preceding synthesized spectrum) to provide a current synthesized spectrum. Step (f) consists of transmitting the entire current synthesized spectrum from transmitter 100 to high resolution image receiver and display 102 over narrow-band communication channel 104. Step (g) consits of replacing, at the receiver, the stored lowest subspectrum (or preceding stored synthesized spectrum) with the current synthesized spectrum as it is received, and then deriving therefrom a display of a higher-resolution entire image.

In the case in which the high-resolution image spectrum is analyzed into a remnant subspectrum and a single bandpass subspectrum, the single bandpass subspectrum is combined with the lowest subspectrum to provide a current synthesized spectrum in step (e) and the higher-resolution entire image displayed in step (g) comprises the entire high-resolution image. Therefore, in this case, step (g) is the last method step of the second embodiment of the present invention shown in FIG. 6. However, in those cases in which the high-resolution image spectrum is analyzed into a remnant subspectrum and more than one bandpass spectra, it is necessary to repeat steps (e), (f) and (g), in order, for each immediately succeeding analyzed bandpass subspectrum stored in the data bank of transmitter 100 until the entire high-resolution image is displayed by receiver and display 102, as indicated by step (h) in FIG. 6. In these latter cases, each successive next-lowest bandpass subspectrum (after the next-to-lowest subspectrum) is combined by step (e) with the preceding synthesized spectrum (not the lowest subspectrum) to provide a current synthesized spectrum.

It is apparent that the second embodiment of the present invention shown in FIG. 6 requires that substantially more image information be transmitted over narrow-band communication channel 104 than is required by the first embodiment of the present invention shown in FIG. 3. In the first embodiment of the present invention shown in FIG. 3, each subspectrum of the analyzed high-resolution image spectrum is transmitted over narrow-band communication channel 104 exactly once. Therefore, there is no redundancy of image-information transmission in the case of this first embodiment. However, in the case of the second embodiment shown in FIG. 6, each subspectrum except the highest spatial-frequency subspectrum is redundantly transmitted over narrow-band communication channel 104, with the lowest subspectrum being transmitted with the most redundancy. The result is that the total amount of time required to transmit the entire high-resolution image over narrow-band communication channel 104 tends to be longer employing the second embodiment of FIG. 6 than is the case employing the first embodiment of FIG. 3 (assuming, as is normally the case, that data compression is employed in transmission, so that the relatively few, samples of each lower-frequency subspectrum are transmitted at the same rate as samples of each higher-frequency subspectrum).

On the other hand, in the second embodiment of FIG. 6, the spectrum synthesizing hardware is confined solely to transmitter 100. Therefore, in the assumed case in which a central transmitter 100 cooperates with a large number of remote interactive terminals, each including a receiver and display 102, there is a cost advantage in eliminating the need for the spectrum-synthesizing hardware in each remote terminal that is required by the first embodiment of FIG. 3.

Further, in those cases in which image information is transmitted over narrow-band communication channel 104 in analog form, it is desirable that the entire available bandwidth of the narrow-band communication channel at all times be used as efficiently as possible in the transmission or image information thereover from transmitter 100 to receiver and display 102. Since, the initially transmitted lowest subspectrum band defines a low-resolution image comprised of the fewest number of pixels, it is desirable that the lowest spatial frequency subspectrum of the analyzed image be temporally compressed for transmission in analog form over narrow-band communication channel 104, so that it can be transmitted in the shortest time, this shortest time employing substantially all of the available bandwidth of narrow-band communication channel 104. However, this temporal compression increases the probability of errors due to noise, etc. However, such errors can be easily tolerated in the display of a low-resolution image, but are likely to be noticeable to a viewer of a higher-resolution displayed image at receiver and display 102.

The transmission in analog form of a synthesized spectrum representing a higher-resolution image comprised of at least four times as many pixels requires a relatively longer time to transmit over narrow-band communication channel 104 than does a lower-resolution image. Hence, any transmission error tends to have much less effect on the lower spatial-frequency portion of the higher resolution image. For this reason, the second embodiment of FIG. 6 replaces the stored lowest subspectrum with the current synthesized spectrum as it is received. Therefore, any errors in the stored lowest subspectrum cannot contribute to noticeable defects in a displayed higher-resolution image (as would be the case if the first embodiment of FIG. 3 were employed).

What is claimed is:

1. A method for transmitting a given relatively high-resolution image from a transmitter to a receiver over a narrow-band communication channel for display of said image at said receiver; said method comprising the steps of:
   (a) analyzing the spatial frequency spectrum of said given image into a plurality of spatial frequency bands including at least a first band and a second band, said first band having a lower nominal high-frequency cutoff than any other of said plurality of bands, said first band defining a low-pass remnant subspectrum of said spatial frequency spectrum and said second band defining a given spectrum;
   (b) initially transmitting only said entire remnant subspectrum of said first band from said transmitter to said receiver over said narrow-band communication channel during a first time interval, the length of said first time interval being short compared to the minimum length of a time interval sufficient to transmit said entire given relatively high-resolution image from said transmitter to said receiver over said narrow-band communication channel;
   (c) at said receiver deriving from said transmitted remnant subspectrum of said first band a relatively low-resolution display of said given image;
   (d) subsequent to the end of said first time interval, transmitting only said entire given spectrum of said second band from said transmitter to said receiver over said narrow-band communication channel during a second time interval; and
   (e) at said receiver employing at least said transmitted given spectrum of said second band to derive a display of said given image at a higher resolution than said relatively low-resolution display.

2. The method defined in claim 1, wherein:
said given spectrum of said second band of said analyzed spatial frequency spectrum defines a bandpass subspectrum and said bandpass subspectrum of said second band has a nominal low-frequency cutoff that is at least as high as the nominal high-frequency cutoff of the low-pass remnant spectrum of said first band;

step (c) comprises at said receiver storing said transmitted first band; and step (e) comprises the step of combining at said receiver said bandpass subspectrum of said transmitted second band with the remnant subspectrum of said stored first band to provide a synthesized spectrum, and employing said synthesized spectrum to derive said display of said given image at a higher resolution than said relatively low-resolution display.

3. The method defined in claim 2, wherein:

step (a) comprises analyzing the spatial frequency spectrum of said given image into a plurality of contiguous spatial frequency bands including said remnant subspectrum first band and a set of N bands defining spatial-frequency bandpass subspectra, where N is an integer having a value of at least one.

4. The method defined in claim 3, wherein:

N has an integral value greater than one, and said contiguous bandpass subspectra of said set of bands are ordinally arranged starting with the bandpass subspectrum of said set which is contiguous with said remnant subspectrum;

step (d) comprises the steps of transmitting only the entire first bandpass subspectrum band of said set as said second band during said second time interval, and thereafter transmitting in order each succeeding entire bandpass subspectrum band of said set to said receiver over said narrow-band communication channel during each of separate successive time intervals; and step (e) comprises the steps at said receiver of combining said first bandpass subspectrum band of said set as it is received with said stored remnant subspectrum first band to provide a first synthesized spectrum band and then storing it and deriving therefrom a display of said given image at a higher resolution than said relatively low-resolution display, and thereafter combining each succeeding bandpass subspectrum band of said set as it is received with that stored synthesized spectrum band that immediately precedes it in order to provide a new synthesized spectrum band, then storing this new synthesized spectrum band and deriving therefrom a display of said given image at a higher resolution than the resolution provided by the display of the stored synthesized spectrum that immediately precedes it in order.

5. The method defined in claim 4, wherein:

each of steps (b) and (d) comprises the step of transmitting from said transmitter to said receiver over said narrow-band communication channel those pixels which spatially define image information closer to the center of said given image during each of said first, second and separate time intervals before the transmission of those pixels which spatially define image information farther from the center of said given image during each of said first, second and separate time intervals; and steps (c) and (e) comprise respectively the steps of displaying the pixels of those portions of said low-resolution image and of each successively higher-resolution image provided by each succeeding stored synthesized spectrum band that spatially define image information closer to the center of said given image before displaying the pixels of those portions of said low-resolution image and of each successively higher-resolution image provided by each succeeding stored synthesized spectrum band that spatially define image information farther from the center of said given image.

6. The method defined in claim 1, wherein:

each of steps (b) and (d) comprises the step of transmitting from said transmitter to said receiver over said narrow-band communication channel those pixels which spatially define image information closer to the center of said given image during each of said first and second time intervals before the transmission of those pixels which spatially define image information farther from the center of said given image during each of said first and second time intervals; and steps (c) and (e) comprise, respectively, the steps of displaying the pixels of those portions of said low-resolution image and for each successively higher-resolution image provided by each successively transmitted band that spatially define image information closer to the center of said given image before displaying the pixels of those portions of said low-resolution image and of each successively higher-resolution image provided by each succeeding stored synthesized spectrum that spatially define image information farther from the center of said given image.

7. The method defined in claim 1, wherein:

said given spectrum of said second band defines a low-pass spectrum having a nominal high-frequency cutoff higher than that of said first band; and step (e) comprises the step of employing at said receiver solely said transmitted low-pass spectrum of said second band to derive a display of said given image at a higher resolution than said relatively low-resolution display.

8. The method defined in claim 7, wherein:

step (a) comprises the step of analyzing the spatial frequency spectrum of said given image into said first band and an ordinally-arranged set of N low-pass spectrum bands starting with said second band, where N is an integer having a value of at least two, and each band of said set above said second band has a nominal high-frequency cutoff above its immediately preceding band of said set;

step (d) comprises the step of transmitting, after the transmission of said entire low-pass spectrum of said second band during said second time interval, each succeeding entire low-pass spectrum band of said set above said second band in order to said receiver over said narrow-band communication channel during each of separate successive time intervals; and step (e) comprises the steps at said receiver of employing at said receiver solely said transmitted low-pass spectrum of each succeeding band of said set above said second band to provide a display of said given image at a higher resolution than the resolution provided by the display of the low-pass spectrum of the band of said set that immediately precedes it in order.

9. The method defined in claim 8, wherein:

each of steps (b) and (d) comprises the step of transmitting from said transmitter to said receiver over said narrow-band communication channel those pixels which spatially define image information closer to the center of said given image during each of said first, second and separate time intervals before the transmission of those pixels which spatially define image information farther from the center of said given image during each of said first, second and separate time intervals; and steps (c) and (e) comprise, respectively, the steps of displaying the pixels of those portions of said low-resolution image and of each successively higher-resolution image provided by each succeeding low-pass spectrum band that spatially define image information closer to the center of said given image before displaying the pixels of those portions of said low-resolution image and of each successively higher-resolution image provided by each succeeding low-pass spectrum band that spatially define image information farther from the center of said given image.

10. The method defined in claim 1, further including the step of storing each of said plurality of spatial frequency bands in said transmitter; and wherein step (b) comprises initially transmitting only said entire stored first band from said transmitter to said receiver over said narrow-band communication channel during a first time interval, the length of said first time interval being short compared to the minimum length of a time interval sufficient to transmit said entire given relatively high-resolution image from said transmitter to said receiver over said narrow-band communication channel; and step (d) subsequent to the end of said first time interval, transmitting only said entire stored given spectrum of said second band from said transmitter to said receiver over said narrow-band communication channel during a second time interval.

11. A method for transmitting a given relatively high-resolution image from a transmitter to a receiver over a narrow-band communication channel for display of said image at said receiver, wherein the analyzed spatial frequency spectrum of said given image is maintained in storage at said transmitter in the form of a plurality of spatial frequency bands including at least a first band and one other band, said first band having a lower nominal high-frequency cutoff than any other of said plurality of bands, said first band defining a low-pass remnant subspectrum of said spatial frequency spectrum and said one other band defining a first given spectrum; said method comprising steps of:

(a) initially transmitting only said entire remnant subspectrum of said stored first band from said transmitter to said receiver over said narrow-band communication channel during a first time interval, the length of said first time interval being short compared to the minimum length of a time interval sufficient to transmit said entire given relatively high-resolution image from said transmitter to said receiver over said narrow-band communication channel;

(b) at said receiver deriving from said transmitted remnant subspectrum of said first band a relatively low-resolution display of said given image;

(c) deriving a second band having a second given spectrum from at least said stored one other band and, subsequent to the end of said first time interval, transmitting only said entire second given spectrum of said second band from said transmitter to said receiver over said narrow-band communication channel during a second time interval; and (d) at said receiver employing at least said transmitted second given spectrum of said second band to derive a display of said given image at a higher resolution than said relatively low-resolution display.

12. The method defined in claim 11, wherein:

said first given spectrum of said stored one other band defines a bandpass subspectrum and said bandpass subspectrum of said stored one other band has a nominal low-frequency cutoff that is at least as high as the nominal high-frequency cutoff of the low-pass remnant spectrum of said first band;

step (b) comprises at said receiver storing said transmitted first band;

step (c) comprises deriving a second band having a second given spectrum substantially identical to said first given bandpass subspectrum of said stored one other band; and step (d) comprises the steps of combining at said receiver said bandpass subspectrum of said transmitted second band with the remnant subspectrum of said stored first band to provide a synthesized spectrum, and employing said synthesized spectrum to derive said display of said given image at a higher resolution than said relatively low-resolution display.

13. The method defined in claim 12, wherein the analyzed spatial frequency spectrum of said given image is maintained in storage in the form of a plurality of contiguous spatial frequency bands including said remnant subspectrum first band and a set of N bands defining spatial-frequency bandpass subspectra, where N is an integer having a value of at least one.

14. The method defined in claim 13, where N has an integral value greater than one, and said contiguous bandpass subspectra of said set of stored bands are ordinally arranged starting with the bandpass subspectrum band of said set which is contiguous with said remnant subspectrum;

step (c) comprises the steps of transmitting only the entire first bandpass subspectrum of said set as said second band during said second time interval, and thereafter transmitting in order each succeeding entire bandpass subspectrum band of said set to said receiver over said narrow-band communication channel during each of separate successive time intervals; and step (d) comprises the steps at said receiver of combining said first bandpass subspectrum band of said set as it is received with said stored remnant subspectrum first band to provide a first synthesized spectrum band and then storing it and deriving therefrom a display of said given image at a higher resolution than said relatively low-resolution display, and thereafter combining each succeeding bandpass subspectrum band of said set as it is received with that stored synthesized spectrum band that immediately precedes it in order to provide a new synthesized spectrum band, then storing this new synthesized spectrum band and deriving therefrom a display of said given image at a higher resolution than the resolution proivded by the display of the stored snythesized spectrum that immediately precedes it in order.

15. The method defined in claim 14, wherein:

each of steps (a) and (c) comprises the step of transmitting from said transmitter to said receiver over said narrow-band communication channel those pixels which spatially define image information closer to the center of said given image during each of said first, second and separate time intervals before the transmission of those pixels which spatially define image information farther from the center of said given image during each of said first, second and separate time intervals; and steps (b) and (d) comprise respectively the steps of displaying the pixels of those portions of said low-resolution image and of each successively higher-resolution image provided by each succeeding stored synthesized spectrum band that spatially define image information closer to the center of said given image before displaying the pixels of those portions of said low-resolution image and of each successively higher-resolution image provided by each succeeding stored synthesized spectrum band that spatially define image information farther from the center of said given image.

16. The method defined in claim 11, wherein:

each of steps (a) and (c) comprises the step of transmitting from said transmitter to said receiver over said narrow-band communication channel those pixels which spatially define image information closer to the center of said given image during each of said first and second time intervals before the transmission of those pixels which spatially define image information farther from the center of said given image during each of said first and second time intervals; and steps (b) and (d) comprise, respectively, the steps of displaying the pixels of those portions of said low-resolution image and of each successively higher-resolution image provided by each successively transmitted band that spatially define image information closer to the center of said given image before displaying the pixels of those portions of said low-resolution image and of each successively higher-resolution image provided by each succeeding stored synthesized spectrum that spatially define image information farther from the center of said given image.

17. The method defined in claim 11, wherein:

said first given spectrum of said stored one other band defines a bandpass subspectrum and said bandpass subspectrum of said stored one other band has a nominal low-frequency cutoff that is at least as high as the nominal high-frequency cutoff of the low-pass remnant spectrum of said first band;

step (c) comprises deriving a second band having a low-pass second given spectrum that is a synthesized combination of said remnant subspectrum and said bandpass subspectrum of said stored one other band; and step (d) comprises the step of employing at said receiver solely said transmitted low-pass second given spectrum of said second band to derive a display of said given image at a higher resolution than said relatively low-resolution display.

18. The method defined in claim 17, wherein the analyzed spatial frequency spectrum of said given image is maintained in storage in the form of a plurality of contiguous spatial frequency bands including said remnant subspectrum first band and a set of N bands defining spatial-frequency bandpass subspectra, where N is an integer having a value of at least one.

19. The method defined in claim 18, where N has an integral value greater than one, and said contiguous bandpass subspectra of said set of stored bands are ordinally arranged starting with the bandpass subspectrum band of said set which is contiguous with said remnant subspectrum;

step (c) comprises the steps of further deriving one or more additional bands each of which has a low-pass spectrum that is a synthesized combination of each successive ordinal bandpass subspectrum above said first bandpass subspectrum of said set and the low-pass spectrum of that one of said synthesized low-pass spectrum bands that immediately precedes it in order, and transmitting, after the transmission of said entire low-pass spectrum of said second band during said second time interval, each succeeding entire low-pass synthesized addition spectrum band of said set above said second band in order to said receiver over said narrow-band communication channel during each of separate successive time intervals; and step (d) comprises the steps at said receiver of employing at said receiver solely said transmitted low-pass synthesized spectrum of each additional band of said set above said second band to provide a display of said given image at a higher resolution than the resolution provided by the display of the low-pass spectrum of the band of said set that immediately precedes it in order.

20. The method defined in claim 19, wherein:

each of steps (a) and (c) comprises the step of transmitting from said transmitter to said receiver over said narrow-band communication channel those pixels which spatially define image information closer to the center of said given image during each of said first, second and separate time intervals before the transmission of those pixels which spatially define image information farther from the center of said given image during each of said first, second and separate time intervals; and steps (b) and (d) comprise respectively the steps of displaying the pixels of those portions of said low-resolution image and of each successively higher-resolution image provided by said second and each additional low-pass synthesized spectrum band that spatially define image information closer to the center of said given image before displaying the pixels of those portions of said low-resolution image and of each successively higher-resolution image provided by said second and each additional low-pass synthesized spectrum band that spatially define image information farther from the center of said given image.

* * * * *